(12) United States Patent
Sun et al.

(10) Patent No.: US 11,512,586 B2
(45) Date of Patent: Nov. 29, 2022

(54) LOGGING WHILE DRILLING TOOL

(71) Applicant: Halliburton Energy Services, Inc., Houston, TX (US)

(72) Inventors: Qingtao Sun, Spring, TX (US); Chung Chang, Houston, TX (US); Richard Timothy Coates, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/064,305

(22) Filed: Oct. 6, 2020

(65) Prior Publication Data

US 2022/0106873 A1 Apr. 7, 2022

(51) Int. Cl.
*E21B 47/14* (2006.01)
*E21B 17/16* (2006.01)

(52) U.S. Cl.
CPC .............. *E21B 47/14* (2013.01); *E21B 17/16* (2013.01)

(58) Field of Classification Search
CPC .. E21B 47/00; E21B 47/0025; E21B 47/0224; E21B 47/08; E21B 47/085; E21B 47/107; E21B 47/14; E21B 47/16
See application file for complete search history.

(56) References Cited

U.S. PATENT DOCUMENTS

| | | |
|---|---|---|
| 3,063,035 A | 11/1962 | Vogel |
| 3,144,090 A | 8/1964 | Mazzagatti |
| 3,190,388 A | 6/1965 | Moser |
| 3,191,141 A | 6/1965 | Schuster |
| 3,191,142 A | 6/1965 | Lebourg |
| 3,191,143 A | 6/1965 | Pardue |
| 3,213,415 A | 10/1965 | Moser |
| 3,271,733 A | 9/1966 | Cubberly |
| 3,364,463 A | 1/1968 | Pardue |
| 3,381,267 A | 4/1968 | Cubberly |
| 3,493,921 A | 2/1970 | Johns |
| 3,608,373 A | 9/1971 | Youmans |
| 4,020,452 A | 4/1977 | Trouiller |
| 4,850,450 A | 7/1989 | Hoyle |
| 5,036,945 A | 8/1991 | Hoyle |
| 5,510,582 A | 4/1996 | Birchak |
| 5,796,677 A | 8/1998 | Kostek |
| 6,082,484 A | 7/2000 | Molz |
| 6,588,267 B1 | 7/2003 | Bradley |
| 6,915,875 B2 | 7/2005 | Dubinsky |
| 7,028,806 B2 * | 4/2006 | Dubinsky .............. G01V 1/523 181/108 |
| 7,032,707 B2 | 4/2006 | Egerev |
| 7,216,737 B2 | 5/2007 | Sugiyama |

(Continued)

*Primary Examiner* — Franklin D Balseca
(74) *Attorney, Agent, or Firm* — K&L Gates LLP (57) ABSTRACT

A logging-while-drilling (LWD) tool for use within a formation. The LWD tool may include a transmitter, a receiver, and an acoustic isolator. The transmitter may be operable to transmit an acoustic signal into the formation. The receiver may be operable to receive an acoustic response from the formation. The acoustic isolator may be positioned longitudinally between the transmitter and the receiver to reduce a transfer of acoustic energy between the transmitter and the receiver through the LWD tool. The acoustic isolator may include annular chambers formed in a body of the acoustic isolator and positioned along a longitudinal axis of the acoustic isolator.

16 Claims, 5 Drawing Sheets

(56) References Cited

U.S. PATENT DOCUMENTS

| | | |
|---|---|---|
| 7,336,562 B1 | 2/2008 | Hoyle |
| 9,448,320 B2 | 9/2016 | Ratcliffe |
| 9,557,435 B2 | 1/2017 | Sugiyama |
| 9,823,375 B2 * | 11/2017 | Nakajima ................. G01V 1/44 |
| 9,891,336 B2 * | 2/2018 | Chang .................... G01V 1/523 |
| 9,927,541 B2 | 3/2018 | Kinoshita |
| 2012/0218862 A1 | 8/2012 | Nakajima |
| 2014/0177391 A1 | 6/2014 | Sugiyama |
| 2015/0293251 A1 | 10/2015 | Kinoshita |

\* cited by examiner

LOGGING WHILE DRILLING TOOL

BACKGROUND

This section is intended to provide relevant background information to facilitate a better understanding of the various aspects of the described embodiments. Accordingly, it should be understood that these statements are to be read in this light and not as admissions of prior art.

In connection with the recovery of hydrocarbons from the earth, boreholes are generally drilled using a variety of different methods and equipment. According to one common method, a roller cone bit or fixed cutter bit is rotated against the subsurface formation to form the borehole. The drill bit is rotated in the borehole through the rotations of a drill string attached to the drill bit and/or by the rotary force imparted to the drill bit by a subsurface drilling motor powered by the flow of drilling fluid down the drill string and through downhole motor. In some situations it is desirable to evaluate the formations being drilled while drilling is conducted. Various instruments are run in the drill string to measure parameters that may be used to evaluate the formation(s). Such systems are often referred to as logging while drilling (LWD) and measurement while drilling (MWD).

Acoustic logging tools can be used in MWD and LWD systems to measure acoustic properties of the formations from which images, mechanical properties or other characteristics of the formations can be derived. Acoustic energy is generated by a logging tool and acoustic waves comprising periodic vibrational disturbances resulting from the acoustic energy propagating through the formation or the acoustic logging system are received by an receiver in the acoustic logging tool, Acoustic waves can be characterized in terms of their frequency, amplitude and speed of propagation. Acoustic properties of interest for formations can include compressional wave speed, shear wave speed, surface waves speed (e.g. Stoneley waves) and other properties. Acoustic images can be used to depict borehole wall conditions and other geological features away from the borehole. The acoustic measurements have applications in seismic correlation, petrophysics, rock mechanics and other areas. An effective operation of the acoustic logging tools can be hindered by undesirable noise signals encountered downhole by the logging tools.

BRIEF DESCRIPTION OF THE DRAWINGS

Embodiments of the logging-while-drilling (LWD) tool are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes a logging-while-drilling (LWD) tool. The LWD tool includes an acoustic isolator that reduces the acoustic energy transferred through the LWD tool body. The present disclosure also describes methods of using the LWD tool and optimizing the acoustic isolator to attenuate a specific frequency range.

A borehole may in some instances be formed in a substantially vertical orientation relative to the earth's surface, and a lateral borehole may in some instances be formed in a substantially horizontal orientation relative to the earth's surface. However, the orientation of each of these boreholes may include portions that are vertical, non-vertical, horizontal, or non-horizontal. Further, the term "uphole" refers a direction that is towards the earth's surface, while the term "downhole" refers a direction that is further into the earth's surface.

Figure 1:
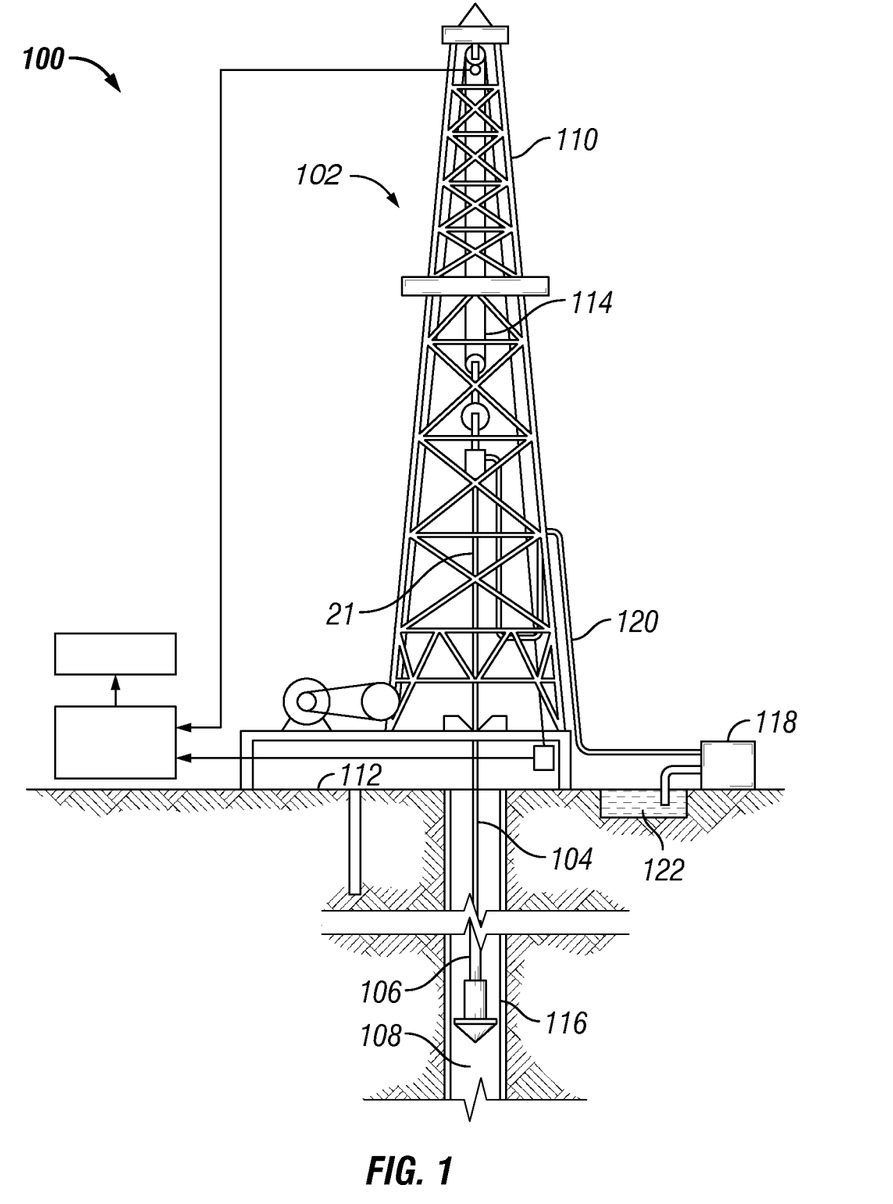
FIG. 1 is a schematic view of a well system, according to one or more embodiments.

FIG. 1 is a schematic view of a well system 100, according to one or more embodiments. The well system 100 includes a drilling rig 102 and a drill string 104, which includes a LWD tool 106 positioned in a borehole 108. The rotary drilling rig 102 can include a mast 110 rising above ground 112 and be fitted with lifting equipment 114. A drill string 104 is formed of drill pipes attached end to end (e.g., threadingly or otherwise), and is suspended into the borehole 108. A drill bit 116 is attached to the downhole end of the drill string 104 to drill the borehole 108.

The drill string 104 is connected to a mud pump 118 (e.g., through a hose 120), which permits the injection of drilling mud into the borehole 108 through the drill string 104. The drilling mud can be drawn from a mud pit 122 that can be fed with surplus mud from the borehole 108. During drilling operations, the drill string 104 can be driven in a rotary motion by means of a kelly 124 fitted to an upper end of the drill string 104 or alternatively by a top drive unit (not shown) or downhole drilling motor (not shown).

Figure 2:
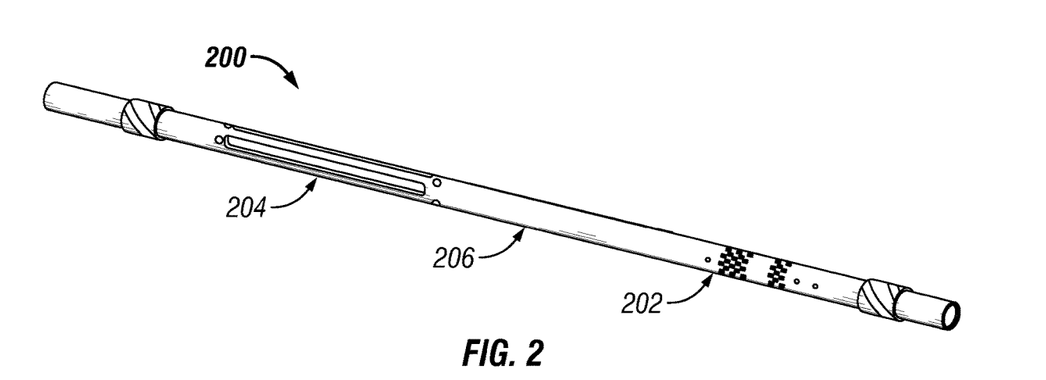
FIG. 2 is a LWD tool, according to one or more embodiments.

Turning now to FIG. 2, FIG. 2 is a LWD tool 200, according to one or more embodiments. The LWD tool 200 includes a transmitter 202 and a receiver 204 separated by an acoustic isolator 206. In operation, the LWD tool 200 is positioned in a borehole, as shown in FIG. 1, and the transmitter 202 mounted in the LWD tool 200 transmits an acoustic signal (or acoustic wave). The acoustic signal propagates through the zone (e.g., a formation, multiple formations or a portion of a formation) through which the borehole is being or has been drilled. The receiver 204 mounted in the LWD tool 200 receives acoustic responses, which includes one or more acoustic signals from the formation. The receiver 204 can include an array of receivers 204, and can record the acoustic responses. The responses can be used to determine the compressional and shear wave velocities (as well as slowness) through the formation.

In addition to the acoustic responses from the formation, the receiver 204 also receives undesirable acoustic signals, which affect the accuracy of the compressional and shear wave velocity measurements. A portion of an acoustic signal that propagates from the transmitter 202 to the receiver 204 through the LWD tool 200 itself (known as tool mode) is an example of such an undesirable acoustic signal. The tool mode, consequently, interferes with the compressional and shear wave arrivals, thereby reducing the quality and accuracy of the readings. Other examples of undesirable acoustic signals include acoustic signals from drilling noises such as vibration of drill bits, impact between drill string and borehole, circulation of drilling mud, and acoustic signals from other sources of noise in the borehole.

The acoustic isolator 206 decreases (e.g., minimize or eliminate) undesirable acoustic signals propagated through the LWD tool 200, e.g., the tool mode. Additionally, the attenuator can be implemented in any application in which acoustic waves transmitted between a transmitter and receiver fixed longitudinally apart on the same tool body, are to be isolated. Implementing the techniques described here can increase an efficiency of the attenuator and reduce a length of the tool resulting in increase in production speed, decrease in production cost, decrease in manufacturing issues and increase in log data quality. The reduced tool mode can also increase the range of formation slowness that the LWD tool 200 can measure (e.g. formation with faster compressional and shear wave speed).

Figure 3:
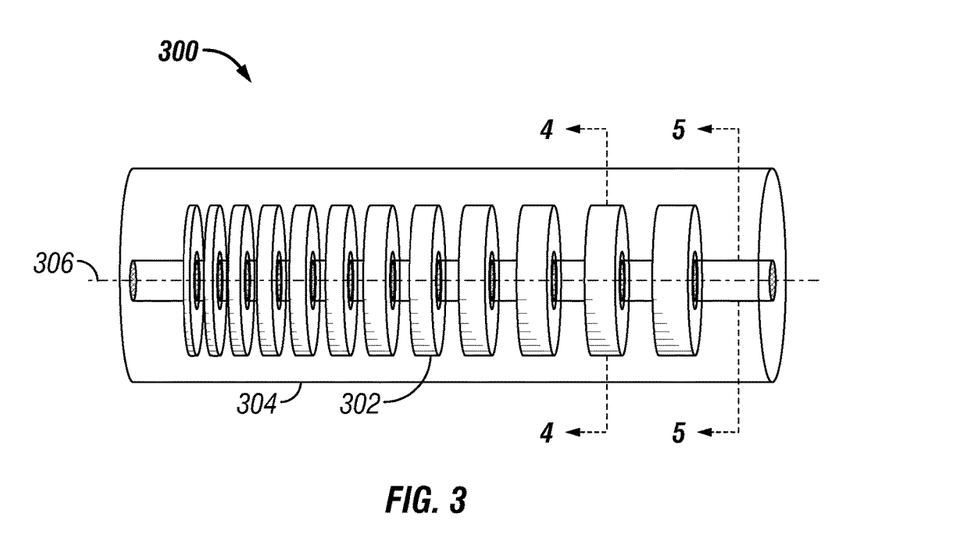
FIG. 3 is an acoustic isolator for a LWD tool, according to one or more embodiments.

Turning now to FIG. 3, FIG. 3 is an acoustic isolator 300 for a LWD tool, according to one or more embodiments. The acoustic isolator 300 includes chambers 302 formed in a body 304 of the acoustic isolator that are positioned along the longitudinal axis 306 of the acoustic isolator 300. The size, position, and number of chambers 302 in the acoustic isolator 300 are selected to attenuate acoustic energy across a selected frequency range, as described in more detail below with reference to FIGS. 7 and 8.

Figure 4:
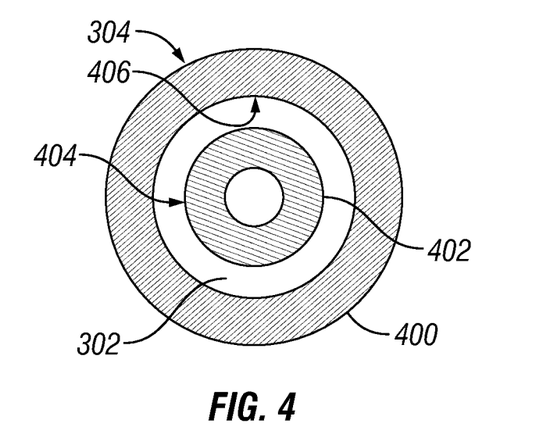
FIG. 4 is a cross-sectional view of the acoustic isolator of FIG. 3 along line A-A.
Figure 5:
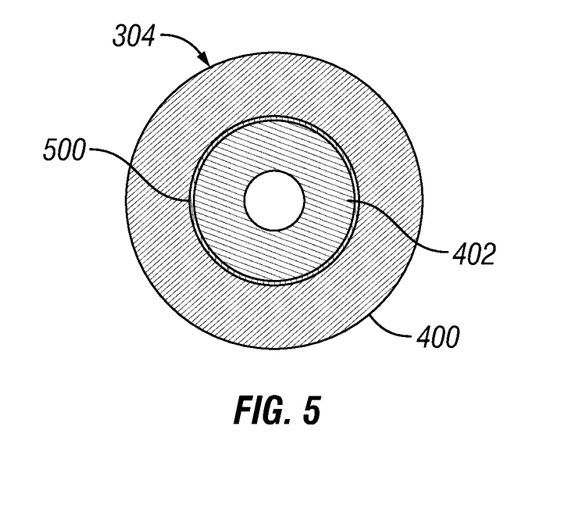
FIG. 5 is a cross-sectional view of the acoustic isolator of FIG. 3 along line B-B.

The body 304 of the acoustic isolator 300 includes an outer collar 400 and an insert 402 positioned within the outer collar 400, as seen more clearly in FIGS. 4 and 5. Grooves are formed into the outer surface 404 of the insert 402, the inner surface 406 of the outer collar 400, or both the outer surface 404 of the insert 402 and the inner surface 406 of the outer collar 400 to create the chambers 302 shown in FIGS. 3 and 4. If grooves are formed in both the outer surface 404 of the insert 402 and the inner surface 406 of the outer collar 400, the grooves are axially aligned to create the chambers 302.

In at least one embodiment, a material 500, such as tungsten rubber or beryllium copper, is positioned between the outer collar 400 and the insert 402 in the areas where the outer collar 400 contacts the insert 402 to create an acoustic bond between the outer collar 400 and the insert 402 such that the outer collar 400 and the insert 402 acoustically behave as a single body. The material 500 may also create a seal between the outer collar and the insert such that the individual chambers 302 are sealed. The sealed chambers 302 may be filled with an attenuating medium, such as air, mud oil, or acoustic dampening powders. In addition to or in place of the material, the insert 402 may be press-fit into the outer collar 400. Further, the outer collar 400 may be heated and the insert 402 may be cooled as part of the press-fitting process. In other embodiments, the chambers 302 may not be sealed to form a fluid flowpath between the outer collar 400 and insert 402 to allow drilling mud or other borehole fluids to flow through the chambers 302.

Figure 6:
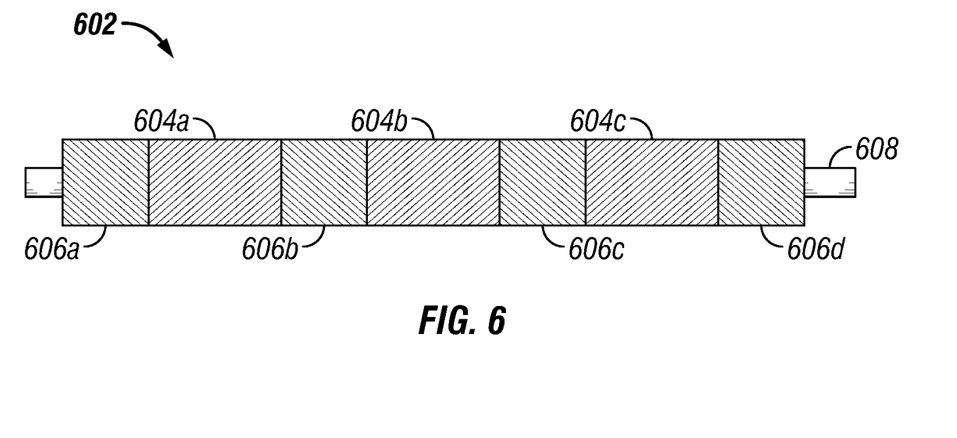
FIG. 6 is an insert for an acoustic isolator, according to one or more embodiments

Turning now to FIG. 6, FIG. 6 is an insert 602 for an acoustic isolator, such as acoustic isolator 300, according to one or more embodiments. The insert 602 includes expandable sleeve rings 604a, 604b, 604c, and compression sleeve rings 606a, 606b, 606c, 606d that extend circumferentially around a central tubular 608. In at least one embodiment, the expandable sleeve rings 604a, 604b, 604c are made from tungsten rubber or another attenuating material that expands when compressed.

Once formed, the insert 602 is inserted into an outer collar using a process similar to that described above with reference to FIGS. 4 and 5. An axial force is then applied to the expandable sleeve rings 604a, 604b, 604c via the outer compression sleeves 606a, 606d. The force causes the expandable sleeve rings 604a, 604b, 604c to compress axially and expand radially to fill grooves in an outer collar. In another embodiment, the inner surface of the outer collar may not have grooves and chambers may be formed between the expandable sleeve rings 604a, 604b, 604c once the expandable sleeve rings 604a, 604b, 604c are compressed and contact the inner surface of the outer collar.

Figure 7:
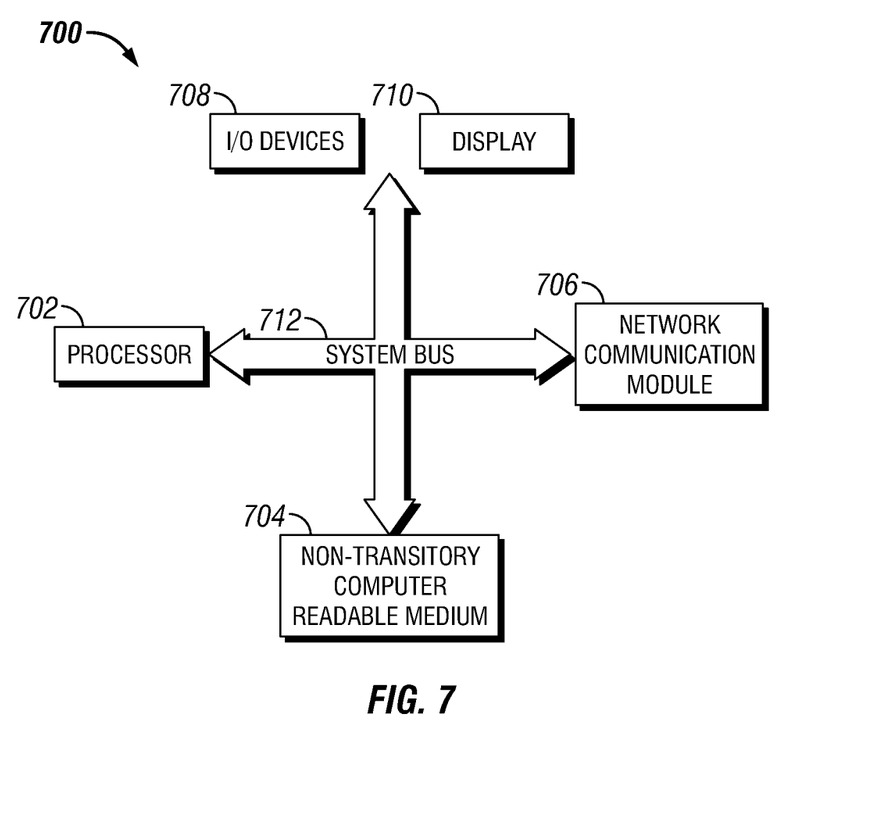
FIG. 7 is a block diagram of a computer system, according to one or more embodiments.

Turning now to FIG. 7, FIG. 7 is a computer system 700 utilized to optimize the design of the acoustic isolator shown in FIGS. 3-5 for a selected frequency range. The computer system includes at least one processor 702, a non-transitory, computer-readable storage 704, a transceiver/network communication module 706, optional input/output devices 708, and an optional display 710 all interconnected via a system bus 712. Software instructions executable by the processor 702 for implementing software instructions stored within the computer system 700 in accordance with the illustrative embodiments described herein, may be stored in the storage 704 or some other non-transitory computer-readable medium.

Although not explicitly shown in FIG. 7, it will be recognized that the computer system 700 may be connected to one or more public and/or private networks via appropriate network connections. It will also be recognized that software instructions may also be loaded into the storage 704 from a CD-ROM or other appropriate storage media via wired or wireless means.

Figure 8:
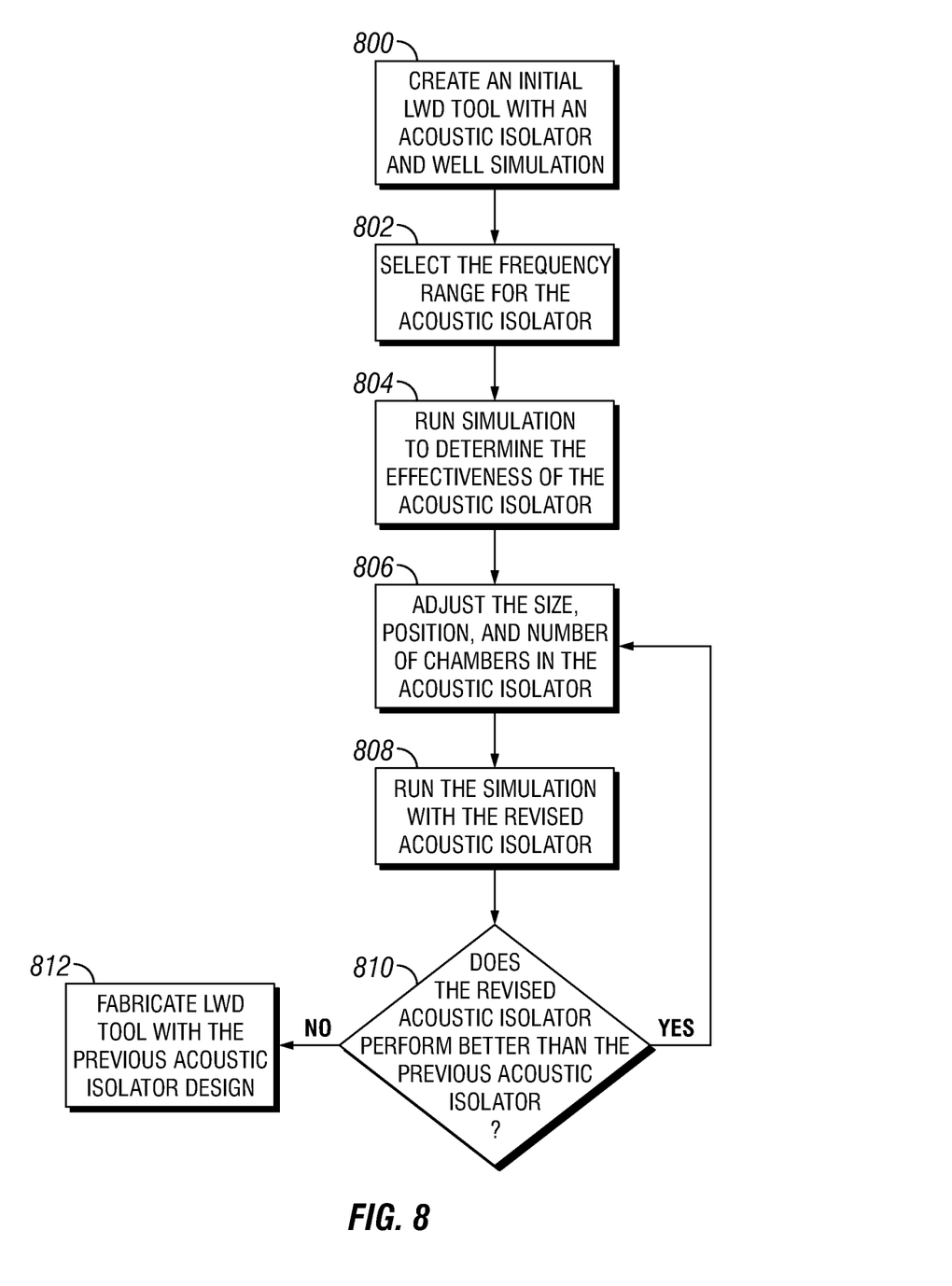
FIG. 8 is a flow chart of a method for drilling a well, according to one or more embodiments.

FIG. 8 illustrates a method for designing an acoustic isolator for a LWD tool, such as the acoustic isolator 300 shown in FIGS. 2-5. The method may be performed by the computer system 700. The illustrated method enables a user to optimize the acoustic isolator to attenuate acoustic energy over a selected frequency range.

In step 800, the computer system 700 is used to create an initial LWD tool with an acoustic isolator. The size, position, and number of chambers within the acoustic isolator is limited by structural requirements associated with a drill string drilling a borehole, such as allowable stress, strain, and/or torque. The computer system 700 also creates a well simulation that is used to determine the effectiveness of the acoustic isolator.

In step 802, a frequency range over which acoustic energy is to be attenuated by the acoustic isolator is selected.

In step 804, the computer system 700 runs the simulation to determine the effectiveness of the acoustic isolator at attenuating acoustic energy over the selected frequency range.

In step 806, the size, position, and number of chambers within the acoustic isolator are adjusted based on the results of the previous simulation run. As with the initial design of the acoustic isolator, the size, position, and number of chambers within the acoustic isolator is limited by the structural requirements associated with the drill string drilling the borehole.

In step 808, the simulation is run again to determine the effectiveness of the new acoustic isolator at attenuating acoustic energy over the selected frequency range.

Once the additional simulation run is complete, it is determined if the revised acoustic isolator performed better than the previous acoustic isolator, as shown in step 810. If the revised acoustic isolator does perform better than the previous acoustic isolator, steps 806-810 are repeated. If the revised acoustic isolator does not perform better than the previous acoustic isolator, a LWD tool is fabricated utilizing the previous acoustic isolator design, as shown in step 812.

Further examples include:

Example 1 is a logging-while-drilling (LWD) tool for use within a formation. The LWD tool includes a transmitter, a receiver, and an acoustic isolator. The transmitter is operable to transmit an acoustic signal into the formation. The receiver is operable to receive an acoustic response from the formation. The acoustic isolator is positioned longitudinally between the transmitter and the receiver to reduce a transfer of acoustic energy between the transmitter and the receiver through the LWD tool. The acoustic isolator includes annular chambers formed in a body of the acoustic isolator and positioned along a longitudinal axis of the acoustic isolator.

In Example 2, the embodiments of any preceding paragraph or combination thereof further include wherein the body of the acoustic isolator includes an outer collar and an insert positioned within the outer collar. Additionally, radial grooves are formed in at least one of an inner surface of the outer collar or an outer surface of the insert to form the annular chambers.

In Example 3, the embodiments of any preceding paragraph or combination thereof further include wherein the radial grooves are formed in both the inner surface of the outer collar and the outer surface of the insert. The radial grooves of the outer collar are axially aligned with the radial grooves of the insert to form the annular chambers.

In Example 4, the embodiments of any preceding paragraph or combination thereof further include a fluid flowpath between the outer collar and the insert.

In Example 5, the embodiments of any preceding paragraph or combination thereof further include wherein at least one of tungsten rubber or beryllium copper is positioned between the outer collar and the insert to create an acoustic bond between the outer collar and the insert.

In Example 6, the embodiments of any preceding paragraph or combination thereof further include wherein the annular chambers are filled with an attenuating medium.

In Example 7, the embodiments of any preceding paragraph or combination thereof further include wherein the attenuating medium comprises at least one of air, oil, water, or acoustic dampening powders.

In Example 8, the embodiments of any preceding paragraph or combination thereof further include wherein the annular chambers are sized and positioned along the longitudinal axis of the acoustic isolator to attenuate acoustic energy across a selected frequency range.

In Example 9, the embodiments of any preceding paragraph or combination thereof further include wherein a number of annular chambers is selected to optimize attenuation of acoustic energy across a selected frequency range.

Example 10 is a method of logging a borehole with an LWD tool. The ( ) method includes transmitting an acoustic signal into the formation surrounding the borehole via a transmitter of the LWD tool. The method also includes receiving an acoustic response from the formation surrounding the borehole via a receiver of the LWD tool. The method further includes attenuating acoustic energy transferred between the transmitter and the receiver through the LWD tool via an acoustic isolator that includes annular chambers formed in a body of the acoustic isolator and positioned along a longitudinal axis of the acoustic isolator.

In Example 11, the embodiments of any preceding paragraph or combination thereof further include wherein attenuating the acoustic energy via the acoustic isolator comprises selecting a number, sizes, and positions of the annular chambers to attenuate acoustic energy across a selected frequency range.

In Example 12, the embodiments of any preceding paragraph or combination thereof further include wherein the annular chambers are formed by positioning an insert of the body within an outer collar of the body. Additionally, radial grooves are formed in at least one of an inner surface of the outer collar or an outer surface of the insert to form the annular chambers.

In Example 13, the embodiments of any preceding paragraph or combination thereof further include wherein the radial grooves are formed in both the inner surface of the outer collar and the outer surface of the insert. The radial grooves of the outer collar are axially aligned with the radial grooves of the insert to form the annular chambers.

In Example 14, the embodiments of any preceding paragraph or combination thereof further include forming a fluid flowpath between the outer collar and the insert.

In Example 15, the embodiments of any preceding paragraph or combination thereof further include a method for designing a LWD tool. The method includes selecting a frequency range over which acoustic energy will be attenuated. The method also includes adjusting the size and position of annular chambers formed in a body of an acoustic isolator of the LWD tool to optimize the design of the acoustic isolator to attenuate acoustic energy over the selected frequency range. The method further includes fabricating the LWD tool with the optimized acoustic isolator design.

In Example 16, the embodiments of any preceding paragraph or combination thereof further include adjusting a number of annular chambers of the acoustic isolator based on a well simulation.

In Example 17, the embodiments of any preceding paragraph or combination thereof further include filling the annular chambers with at least one of air, oil, water, or acoustic dampening powders.

In Example 18, the embodiments of any preceding paragraph or combination thereof further include wherein the annular chambers are formed by positioning an insert of the body within an outer collar of the body. Additionally, radial grooves are formed in at least one of an inner surface of the outer collar or an outer surface of the insert to form the annular chambers.

In Example 19, the embodiments of any preceding paragraph or combination thereof further include wherein the radial grooves are formed in both the inner surface of the outer collar and the outer surface of the insert. The radial grooves of the outer collar are axially aligned with the radial grooves of the insert to form the annular chambers.

In Example 20, the embodiments of any preceding paragraph or combination thereof further include forming a fluid flowpath between the outer collar and the insert.

For the embodiments and examples above, a non-transitory machine-readable storage device can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A logging-while-drilling (LWD) tool for use within a formation, the LWD tool comprising:

a transmitter operable to transmit an acoustic signal into the formation;
a receiver operable to receive an acoustic response from the formation; and
an acoustic isolator positioned longitudinally between the transmitter and the receiver and configured to reduce a transfer of acoustic energy between the transmitter and the receiver through the LWD tool, the acoustic isolator comprising a plurality of individual annular chambers that are substantially sealed and formed in a body of the acoustic isolator and positioned along a longitudinal axis of the acoustic isolator;
wherein the body of the acoustic isolator comprises:
an outer collar:
an insert positioned within the outer collar; and
wherein radial grooves are formed in at least one of an inner surface of the outer collar or an outer surface of the insert to form the plurality of individual substantially sealed annular chambers.

2. The LWD tool of claim 1, wherein:
the radial grooves are formed in both the inner surface of the outer collar and the outer surface of the insert; and
the radial grooves of the outer collar are axially aligned with the radial grooves of the insert to form the annular chambers.

3. The LWD tool of claim 2, wherein at least one of tungsten rubber or beryllium copper is positioned between the outer collar and the insert to create an acoustic bond between the outer collar and the insert.

4. The LWD tool of claim 3, wherein the annular chambers are filled with an attenuating medium.

5. The LWD tool of claim 4, wherein the attenuating medium comprises at least one of air, oil, water, or acoustic dampening powders.

6. The LWD tool of claim 1, wherein the annular chambers are sized and positioned along the longitudinal axis of the acoustic isolator to attenuate acoustic energy across a selected frequency range.

7. The LWD tool of claim 1, wherein a number of annular chambers is selected to optimize attenuation of acoustic energy across a selected frequency range.

8. The LWD tool of claim 1, wherein the radial grooves are formed in the inner surface of the outer collar, and wherein the insert comprises:
a compression sleeve ring that extends circumferentially around a central tubular; and
an expandable sleeve ring axially adjacent to the compression sleeve ring along the longitudinal axis, wherein the expandable sleeve ring is made of tungsten rubber and is configured to expand radially into contact with the inner surface of the outer collar in response to an axial compression force to form the plurality of individually sealed annular chambers.

9. The LWD tool of claim 3, wherein the annular chambers are filled with an attenuating medium that is not part of the insert.

10. A method of logging a borehole with an LWD tool, the method comprising:
transmitting an acoustic signal into a formation surrounding the borehole via a transmitter of the LWD tool;
receiving an acoustic response from the formation surrounding the borehole via a receiver of the LWD tool; and
attenuating acoustic energy transferred between the transmitter and the receiver through the LWD tool via an acoustic isolator comprising a plurality of individual annular chambers that are substantially sealed and formed in a body of the acoustic isolator and positioned along a longitudinal axis of the acoustic isolator, wherein teh plurality of individual substantially sealed annular chambers is formed by positioning an insert of the body within an outer collar of the body, and radial grooves are formed in at least one of an inner surface of the outer collar or an outer surface of the insert to form the plurality of individual substantially sealed annular chamers.

11. The method of claim 10, wherein attenuating the acoustic energy via the acoustic isolator comprises selecting a number, sizes, and positions of the annular chambers to attenuate acoustic energy across a selected frequency range.

12. The method of claim 10, wherein:
the radial grooves are formed in both the inner surface of the outer collar and the outer surface of the insert; and
the radial grooves of the outer collar are axially aligned with the radial grooves of the insert to form the annular chambers.

13. A method for designing a LWD tool, the method comprising:
selecting a frequency range over which acoustic energy will be attenuated;
adjusting a size and a position of a plurality of individual annular chambers that are substantially sealed and formed in a body of an acoustic isolator of the LWD tool to optimize a design of the acoustic isolator to attenuate acoustic energy over the selected frequency range; and
fabricating the LWD tool with the optimized acoustic isolator design, wherein the plurality of individual substantially sealed annular chambers is formed by positioning an insert of the body within an outer collar of the body, adn radial grooves are formed in at least one of an inner surface of the outer collar or an outer surface of the insert to form the plurality of individual substantially sealed annular chambers.

14. The method of claim 13, further comprising adjusting a number of annular chambers of the acoustic isolator based on a well simulation.

15. The method of claim 13, further comprising filling the annular chambers with at least one of air, oil, water, or acoustic dampening powders.

16. The method of claim 13, wherein:
the radial grooves are formed in both the inner surface of the outer collar and the outer surface of the insert; and
the radial grooves of the outer collar are axially aligned with the radial grooves of the insert to form the annular chambers.

* * * * *

UNITED STATES PATENT AND TRADEMARK OFFICE
CERTIFICATE OF CORRECTION

PATENT NO. : 11,512,586 B2
APPLICATION NO. : 17/064305
DATED : November 29, 2022
INVENTOR(S) : Qingtao Sun, Chung Chang and Richard Timothy Coates It is certified that error appears in the above-identified patent and that said Letters Patent is hereby corrected as shown below:

In the Claims

Claim 10, Column 9, Line 3: "wherein teh plurality of individual substantially sealed" should read "wherein the plurality of individual substantially sealed".

Claim 13, Column 10, Line 9: "of the body, adn radial grooves are formed in at least" should read "of the body, and radial grooves are formed in at least".

Signed and Sealed this
Seventeenth Day of January, 2023

Katherine Kelly Vidal
*Director of the United States Patent and Trademark Office*